(12) United States Patent
Kagami et al.

(10) Patent No.: US 6,701,041 B2
(45) Date of Patent: Mar. 2, 2004

(54) OPTICAL FILTER MODULE AND OPTICAL APPARATUS USING THE SAME

(75) Inventors: Kaoru Kagami, Tokyo (JP); Toshihisa Kurosawa, Tokyo (JP); Hidekuni Asai, Tokyo (JP); Seiichi Yokoyama, Tokyo (JP); Yoshiatsu Yokoo, Saitama (JP)

(73) Assignee: Hoya Corporation, Tokyo (JP)

( * ) Notice: Subject to any disclaimer, the term of this patent is extended or adjusted under 35 U.S.C. 154(b) by 87 days.

(21) Appl. No.: 10/028,364

(22) Filed: Dec. 28, 2001

(65) Prior Publication Data
US 2002/0122622 A1 Sep. 5, 2002

(30) Foreign Application Priority Data

Dec. 28, 2000 (JP) ........................................ 2000-401591

(51) Int. Cl.⁷ .................................................. G02B 6/32
(52) U.S. Cl. ............................. 385/34; 385/24; 385/31; 385/33; 385/60; 385/80; 385/84
(58) Field of Search .............................. 385/34, 24, 31, 385/33, 39, 60, 50, 84; 359/382

(56) References Cited

U.S. PATENT DOCUMENTS

| | | | | |
|---|---|---|---|---|
| 4,718,055 A | * | 1/1988 | Winzer | 359/131 |
| 5,453,827 A | * | 9/1995 | Lee | 356/73.1 |
| 5,652,814 A | * | 7/1997 | Pan et al. | 385/24 |
| 5,889,904 A | * | 3/1999 | Pan et al. | 385/24 |
| 6,282,339 B1 | * | 8/2001 | Zheng | 385/34 |
| 6,347,170 B1 | * | 2/2002 | Zheng | 385/34 |
| 6,396,980 B1 | * | 5/2002 | Liu et al. | 385/34 |
| 6,404,954 B1 | * | 6/2002 | Zhu et al. | 385/34 |
| 6,454,465 B1 | * | 9/2002 | Uschitsky et al. | 385/79 |
| 6,498,876 B1 | * | 12/2002 | Liu et al. | 385/34 |
| 6,546,169 B1 | * | 4/2003 | Lin et al. | 385/39 |
| 2003/0063853 A1 | * | 4/2003 | Huang et al. | 385/34 |
| 2003/0072527 A1 | * | 4/2003 | Li et al. | 385/34 |

\* cited by examiner

Primary Examiner—Brian Healy
Assistant Examiner—Daniel Petkovsek
(74) Attorney, Agent, or Firm—Sughrue Mion, PLLC

(57) ABSTRACT

A groove portion to stay the adhesive agent penetrated into either one of closely contacted surfaces of the rod lens and the optical filter is formed, thereby, the penetration of the adhesive agent into the optical path is prevented.

10 Claims, 9 Drawing Sheets

OPTICAL FILTER MODULE AND OPTICAL APPARATUS USING THE SAME

BACKGROUND OF THE INVENTION

1. Field of the Invention

The present invention relates to optical filter modules and optical apparatuses using them, and particularly to an optical filter module including an optical filter, an optical system to guide the light to be supplied to the optical filter and the optical system to guide the light supplied from the optical filter, and various kinds of optical apparatuses such as an optical multi/demultiplexer using it or an optical equalizer.

2. Description of the Related Art

In a field of optics, an optical filter module is used, which is comprised of an optical filter to selectively transmit, attenuate, or reflect the light with a specific wavelength, and an optical system to supply the light to the optical filter or guide the light from the optical filter. For example, there known the apparatuses such as an optical multi/demultiplexer which multiplexes a plurality of lights with different wavelengths and demultiplexes the light to a plurality of lights with different wavelengths or a light equalizer which corrects intensity of the light that is not constant to the wavelength to the one that is constant.

FIG. 32 shows an optical multi/demultiplexer 90 as an example of an optical filter module. This optical multi/demultiplexer 90 is provided with a first collimator 100 having 2 optical fibers 101 and 102, and a second collimator 110 having one optical fiber 111, and a wavelength band-pass filter 95 arranged between these collimators 100 and 110.

The first collimator 100 and the second collimator 110 have ceramic fiber holders 104 and 114 to hold the optical fiber. In the fiber holder 104 of the first collimator 100, two through-holes having a circular sectional shape, are formed along its longitudinal direction, and in the fiber holder 114 of the second collimator 110, one through-hole whose sectional shape is circular is formed along its longitudinal direction. The optical fibers are inserted into these through-holes, and held by being fixed by an adhesive agent.

Further, on the first collimator 100 and the second collimator 110, rod lenses 103 and 112 to collimate and converge the light are provided. These rod lenses 103 and 112 are held by inner holders 105 and 115 together with the optical fiber holders 104 and 114, and these inner holders 105 and 115 are fixed in an outside holder 120 by using the adhesive agent or soldering, or a method such as a YAG welding.

A wavelength band-pass filter 95 is closely contacted under the close contact condition to the rod lens 103, and fixed by the adhesive agent 107 coated around the closely contacted surface.

When the light is demultiplexed by such an optical multi/demultiplexer 90, the light incident into one of optical fibers of the first collimator 100 is collimated by the rod lens 103, and reaches the wavelength band-pass filter 95. The light of the wavelength reflected by this wavelength band-pass filter 95 passes through the rod lens 103, and emitted from the other optical fiber of the first collimator 100. On the other hand, the light passes through the wavelength band-pass filter 95 is converged by the rod lens 112 of the second collimator 110 and emitted from the optical fiber 111.

Further, when the light is multiplexed by such an optical multi/demultiplexer 90, the light incident from the optical fiber 111 of the second collimator 110, is multiplexed with the light introduced one of the optical fibers of the first collimator 100, and outputted from the other optical fiber of the first collimator.

However, in such the optical multi/demultiplexer 90 as described above, there is sometimes a case where the adhesive agent 107 before hardening, which is coated on the outer peripheral surface of the rod lens 103 and wavelength band-pass filter 95 penetrates between the closely contacted surfaces of the rod lens 103 and the wavelength band-pass filter 95 by a capillary phenomenon. Further, the closely contacted surface of the wavelength band-pass filter 95 is inclined to the closely contacted surface of the rod lens 103, thereby, a gap is generated between the rod lens 103 and the wavelength band-pass filter 95, and there is a case where the adhesive agent 107 before hardening penetrates from the gap.

When this adhesive agent 107 reaches a central portion of the closely contacted surface including the optical path, the adhesive agent interrupts the optical path and increases the loss of the light. Further, there is also a case where, by the temperature change under the using environment, the adhesive agent 107 penetrated into the closely contacted surfaces is expanded and contracted, and the position dislocation of the wavelength band-pass filter 95 is generated, or the stress is generated by the contact of the optical parts, and the loss of the light is increased.

SUMMARY OF THE INVENTION

In order to prevent this, it is considered that, as the adhesive agent 107, the adhesive agent whose viscosity is high is used, and the penetration into between closely contacted surfaces is prevented, however, even when such the adhesive agent is used, it is difficult to perfectly prevent the penetration. Further, in the adhesive agent whose viscosity is high, the control of the coating amount is difficult, and there is also a problem that a dispenser to coat the adhesive agent is high in cost. Further, there is also a problem that, naturally, in the closely contacting of the optical parts, because it is necessary to use the adhesive agent whose thermal expansion property is low, the width of the selection of the adhesive agent having a predetermined viscosity is very narrow.

The present invention is attained for solving the above problems, and an object of the present invention is to provide a optical filter module by which the loss of the light by the adhesive agent penetrated between the closely contacted surfaces of the rod lens and the optical filter can be reduced, and each kind of optical devices such as an optical multi/demultiplexer using it.

In order to attain the above object, the optical filter module in the present invention is provided with an optical filter to selectively transmit, attenuate or reflect the light with a specific wavelength, and the first optical system including the optical fiber to guide the light to be supplied to the optical filter, and the second optical system which is oppositely provided to the first optical system through the optical filter, and which includes the optical fiber to guide the light to be supplied from the optical filter, wherein each of the optical systems has the a lens to optically connect the optical fiber and the optical filter, and the surface including the optical path of the optical filter is closely contacted by the adhesive agent coated on a portion which is not the optical path, under the closely contacted with the end surface including the optical path of any one lens of the first or second optical systems, and a groove portion to stay the adhesive agent penetrated between the closely contacted surfaces on at least one closely contacted surface of the optical filter and the lens, and to interrupt the adhesive agent from invading into the optical path is formed.

Further, the optical filter module of the present invention is provided with an optical filter to selectively transmit, attenuate or reflect the light with a specific wavelength, and the first optical system including the optical fiber to guide the light to be supplied to the optical filter, and the second optical system which is oppositely provided to the first optical system through the optical filter, and which includes the optical fiber to guide the light to be supplied from the optical filter, wherein each of the optical systems has the a lens to optically connect the optical fiber and the optical filter, and on the end surface of one lens of the optical system, a convex surface including the optical path and a flat portion protruded to the outside of the optical path direction more than the convex surface from the periphery of the convex surface are formed, and the surface including the optical path of the optical filter is closely contacted to the lens by the adhesive agent coated on a portion which is not the optical path, under closely contacted condition with the flat portion of the lens.

According to the optical filter module according to the present invention, because the adhesive agent before hardening penetrated between the closely contacted surfaces of the optical filter and the rod lens is stayed in the groove portion or between the convex surface and the flat portion, it is prevented that the adhesive agent reaches a central portion as the optical path and interrupts the optical path.

Further, when the adhesive agent penetrated between the closely contacted surfaces is expanded and contracted by the temperature change under the using environment, the expanded portion and contracted portion can be absorbed by the groove portion or between the convex surface and the flat portion. Accordingly, the optical filter module having the small optical loss can be provided.

DESCRIPTION OF THE PREFERRED EMBODIMENTS

Figure 1:
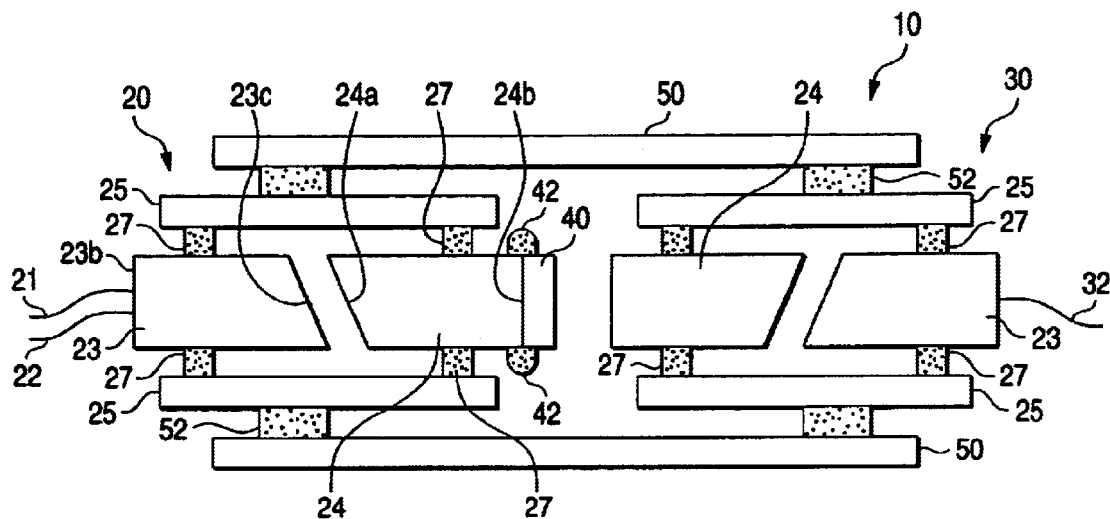
FIG. 1 is a sectional view showing the outline of the first embodiment of an optical multi/demultiplexer according to the present invention.

Referring to the drawings, embodiments of the present invention will be described below.

FIG. 1 shows the first embodiment of an optical multi/demultiplexer according to the present invention. This optical multi/demultiplexer 10 is used in such a case where a plurality of optical signals having the different wavelengths propagated on one optical fiber are demultiplexed into the light of each wavelength, or reversely, a plurality of optical signals having the different wavelengths are multiplexed and guided to one optical fiber.

This optical multi/demultiplexer 10 is provided with the first collimator 20 as the first optical system and the second collimator 30 as the second optical system which are oppositely provided to each other, a wavelength band-pass filter 40 provided between the first collimator 20 and the second collimator 30, and an outside holder 50 to hold the first collimator 20 and the second collimator 30.

The first collimator 20 is provided with a transmission path terminal fiber 21, a reflection terminal fiber 22, and a fiber holder 23 to hold the fibers 21 and 22, a rod lens 24 oppositely provided to the fiber holder 23, and an inside holder 25 to hold the fiber holder 23 and the rod lens 24.

The transmission path terminal fiber 21 guides the multiplexed light at the time of light synthesizing, and guides the light to be demultiplexed at the time of the light demultiplex. Further, the reflection terminal fiber 22 guides the light to be multiplexed at the time of light synthesizing, and guides the demultiplex light at the time of light demultiplex. As these fibers 21 and 22, an optical fiber for used in the optical communication, or a single mode fiber to normally transmit only the single mode light is used. The material of this optical fiber can appropriately be selected corresponding to its use, and for example, when the light of 1.55 $\mu$m band is transmitted, a quartz fiber is used. In the optical multi/demultiplexer 10 according to the present invention, when the light from the wavelength band-pass filter is not used, it is not necessary to provide the reflection terminal fiber 22.

Figure 2:
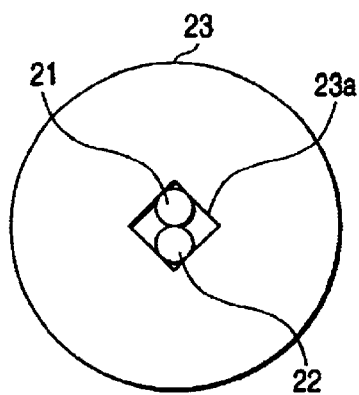
FIG. 2 is a sectional view showing the outline of a fiber holder.
Figure 3:
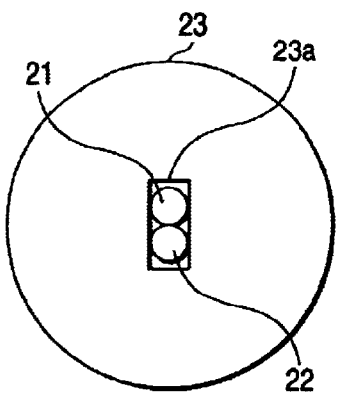
FIG. 3 is a sectional view showing the outline of another example of the fiber holder.

A fiber holder 23 is a cylindrical member, and it is polished so that its one end is a vertical surface 23b perpendicular to the optical axis, and the other end is an inclined surface 23c which forms a predetermined angle (for example, 8°) to the surface perpendicular to the optical axis. In the fiber holder 23, as shown in FIG. 2 or FIG. 3, a through-hole 23a is formed along the longitudinal direction central axis. The transmission path terminal fiber 21 and the reflection terminal fiber 22 are inserted into this through-hole 23a, and held by being fixed by the adhesive agent such as the thermo-hardening type adhesive agent or the light-hardening type adhesive agent (for example, ultraviolet hardening type adhesive agent). The through-hole 23a is, for example, as shown in FIG. 2, formed into a square cross section so that 2 fibers 21 and 22 can be arranged on the diagonal line and inserted, or as shown in FIG. 3, formed into a rectangular cross section so that 2 fibers can be arranged in the longitudinal direction and inserted. Thereby, the fibers 21 and 22 can be easily inserted into the through-hole 23a, or in the through-hole 23a, the center of the fibers 21 and 22 can be easily aligned. Further, there is no case where these fibers 21 and 22 are twisted in the through-hole 23a, and its relative position is changed, and the loss of the light demultiplexing and the light synthesizing can be reduced.

Such a fiber holder 23 can be formed of glass such as boro-silicated glass, or ceramics such as zirconia. When the fiber holder 23 is formed of glass, the fibers 21 and 22 can be inserted in the through-hole 23a while being visually observed, and as the adhesive agent, light hardening type resin is used, and by irradiating the light from the outside, the fibers 21 and 22 can be fixed.

One end of the transmission path terminal fiber 21 and the reflection path terminal fiber 22 are pulled out to the outside from the vertical surface 23b of the fiber holder 23, and the other end of them are arranged so as to form the same plane as the inclined surface 23c.

The rod lens 24 is a cylindrical member formed of the optical material such as glass, and one end is a vertical surface 24b perpendicular to the optical axis, and the other end is an inclined surface 24a forming a predetermined angle (for example, 8°) to the perpendicular surface to the optical axis in order to increase the incident efficiency of the light. The refractive index distribution is formed in the radial direction so that this rod lens 24 collimates the incident light from the inclined surface 24a side, and converges the light incident from the vertical surface 24b side. It is preferable that the antireflection film is formed on both end surfaces 24a and 24b of the rod lens 24.

As this rod lens 24, when a rod lens whose pitch is not larger than 0.25, is used, the optical multi/demultiplexer can be structured under the condition in which the rod lens 24 is not contact with the fiber holder 23. Accordingly, it can be prevented that the collision of the rod lens 24 and fiber holder 23 occurs accompanied by the thermal expansion and contraction of each component, or position dislocation occurs. Further, because it is not necessary that the rod lens 24 and fiber holder 23 are closely contacted with the adhesive agent, there is no possibility that the adhesive agent penetrates on the optical path. Further, without depending on the rod lens 24 and the inclined surfaces 23c and 24a of the fiber holder 23, these can be easily aligned. On the one hand, as the rod lens, when a rod lens whose pitch is not larger than 0.2 is used, the aberration increases and the handling at the time of assembling becomes difficult. Accordingly, it is preferable that, as the rod lens 24, a rod lens whose pitch is not smaller than 0.2 and not larger than 0.25, specifically, about 0.23 is used.

The inside holder 25 is a cylindrical member formed of glass such as boro-silicated glass or quartz glass, or metallic material such as stainless steel, and its inner diameter is set slightly larger than the outer diameter of the fiber holder 23 and rod lens 24. The fiber holder 23 and rod lens 24 are fixed on inner surface of the inside holder 25 by the adhesive agent 27 through a predetermined distance.

In the first collimator 20, the position is adjusted so that the light incident to the transmission path terminal fiber 21 reaches the wavelength filter 40 through the rod lens 24, and the reflected light on the wavelength band-pass filter 40 is introduced to the reflection terminal fiber 22 through the rod lens 24. Thereby, the positional relationship is made such that the light incident to the reflection terminal fiber 22 reaches the wavelength band-pass filter 40 through the rod lens 24, and the light reflected on the wavelength band-pass filter 40 is introduced into the transmission path terminal fiber 21 through the rod lens 24.

The second collimator 30 is provided with a pass terminal fiber 32 which introduces the light to be multiplexed at the time of synthesizing, and guides the demultiplexed light at the time of demultiplexing, a fiber holder 23 to hold the pass terminal fiber 32, the rod lens 24 oppositely provided to the fiber holder 23, and an inside holder 25 to hold the fiber holder 23 and the rod lens 24. Because this second collimator 30 has the same structure as the first collimator 20 except for a point in which the through-hole of the fiber holder 23 can be made to have circular cross section, its detailed description will be neglected.

On the vertical surface 24b of the rod lens 24 of the first collimator 20, a wavelength band-pass filter 40 having the wavelength selectivity which transmits the light with the specific wavelength, and reflects the other light, is provided. This wavelength band-pass filter 40 is closely contacted to the vertical surface 24b of the rod lens 24 by the adhesive agent 42 provided on the outer peripheral surface of the wavelength band-pass filter 40 and the rod lens 24. As this wavelength band-pass filter 40, for example, a band pass filter which transmits only the light of a specific wavelength range, high pass filter which transmits only the light of more than a specific wavelength, or low pass filter which transmits only the light of lower than a specific wavelength, can be used.

As such the wavelength band-pass filter 40, for example, a dielectric multi-layer film filter in which a high refractive index dielectric film and a low refractive index dielectric film are alternately laminated, can be used. In this case, the wavelength selectivity of the wavelength band-pass filter 40 can be appropriately changed by changing the number of layers of the dielectric film, and material.

Figure 4:
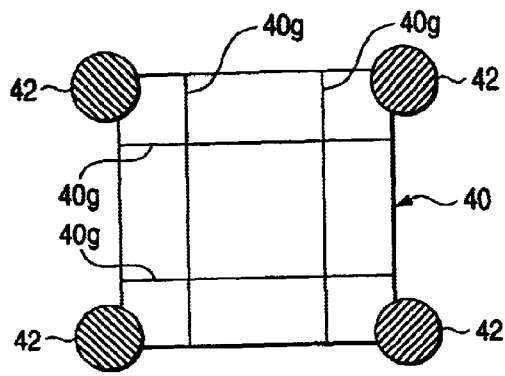
FIG. 4 is a plan view showing a groove portion formed in a wavelength band-pass filter.
Figure 5:
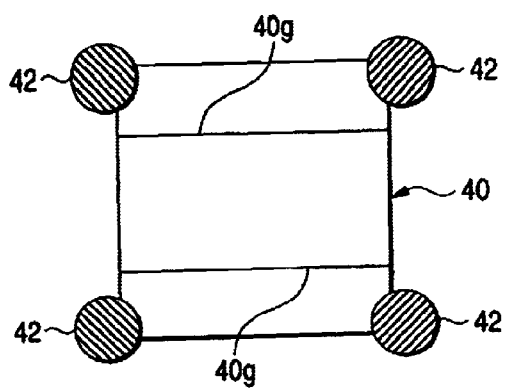
FIG. 5 is a plan view showing another example of the groove portion formed in the wavelength band-pass filter.
Figure 6:
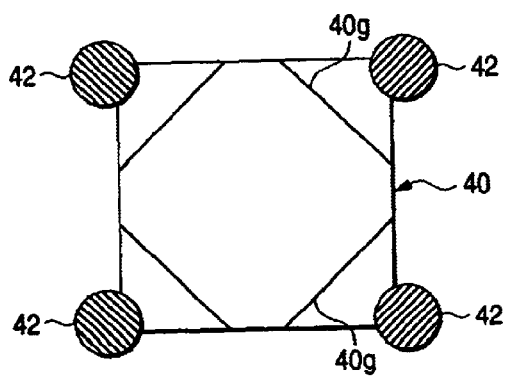
FIG. 6 is a plan view showing other example of the groove portion formed in the wavelength band-pass filter.
Figure 7:
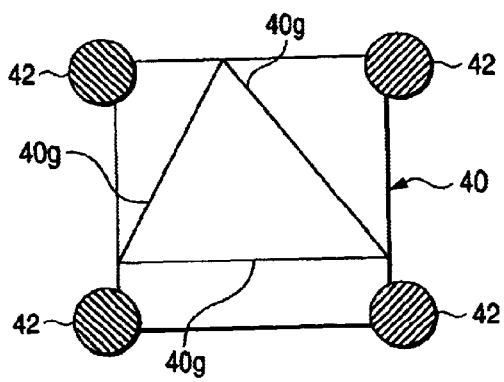
FIG. 7 is a plan view showing other example of the groove portion formed in the wavelength band-pass filter.

On the closely contacted surface of the wavelength band-pass filter 40, a groove portion 40g to prevent the adhesive agent 42 from invading the central portion which is a optical path of the wavelength band-pass filter 40 and rod lens 24, is formed. The groove portion 40g can be formed into, for example, a lattice shape to surround the central portion including the optical path as shown in FIG. 4, a pair of parallel shape to interrupt a portion on which the adhesive agent 42 is coated, from the central portion as shown in FIG. 5, two pairs of parallel shape to interrupt a portion on which the adhesive agent 42 is coated, from the central area as shown in FIG. 6, or the triangular shape to surround a central portion including the optical path as shown in FIG. 7. Thereby, the adhesive agent 42 penetrated in the closely contacted surfaces of the rod lens 24 and the optical filter 40 is stayed in the groove portion 40g, and it can be prevented that the adhesive agent 42 penetrates to the central portion which is the optical path. Such the groove portion 40g is formed by cutting the closely contacted surface of the wavelength band-pass filter 40 by using, for example, a diamond blade. On the end surface of the second collimator 30 side of this wavelength band-pass filter 40, the antireflection film is formed at need.

As the adhesive agent 42 to adhere the wavelength band-pass filter 40 and the rod lens 24, an adhesive agent in which the viscosity is high, normally, more than 10000 mPa·s, is used, in order to reduce the invading amount into the closely contacted surfaces of the rod lens 24 and the wavelength band-pass filter 40, and to easily stay the adhesive agent 42 penetrated to the closely contacted surfaces in the groove portion 40g.

The outside holder 50 is a cylindrical member whose inner diameter is larger than the outer diameter of the first collimator 20 and the second collimator 30. This outside holder is formed of, for example, metallic material such as stainless steel, or glass such as boro-silicated glass or quartz glass. The first collimator 20 and the second collimator 30 are fixed on the inner surface of the outside holder 50 by the adhesive agent 52 through a predetermined distance.

In the optical multi/demultiplexer 10 having the structure described above, the first collimator 20, wavelength band-pass filter 40 and the second collimator 30 are arranged so that the light transmitted through the wavelength band-pass filter 40 in the light introduced from the transmission path terminal fiber 21 is converged in the transmission terminal fiber 32 of the second collimator 30.

Next, the production method of the optical multi/demultiplexer 10 having the structure described above will be described.

Figure 8:
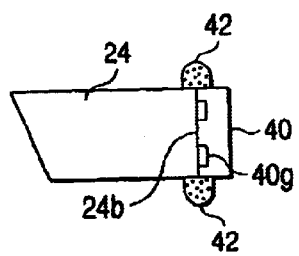
FIG. 8 is a sectional view showing a condition that a rod lens and the wavelength band-pass filter are jointed.

Initially, the groove portion 40g is formed by using the diamond blade on the closely contacted surface of the wavelength band-pass filter 40. Then, as shown in FIG. 8, the closely contacted surface (groove portion forming surface) of the wave length band-pass filter 40 is closely contacted with the vertical surface 24b of the rod lens 24 on both end surfaces of which the antireflection film is formed at need, and the adhesive agent 42 is coated around them and they are fixed. In this case, according to the present invention, because the adhesive agent before hardened, penetrated in the closely contacted surfaces of the wavelength band-pass filter 40 and the rod lens 24 is stayed in the groove portion 40g, it is prevented that the adhesive agent 42 reaches the central portion which is a light path, and interrupts the light path.

Figure 9:
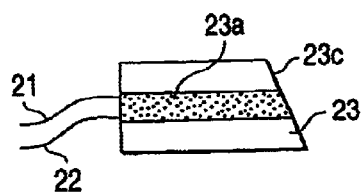
FIG. 9 is a sectional view showing a condition that an optical fiber is held by a fiber holder.

On the other hand, as shown in FIG. 9, the transmission path terminal fiber 21 and reflection terminal fiber 22 are inserted into the through-hole 23a of the fiber holder 23, and the adhesive agent is filled in the through-hole and hardened. Then, polishing is conducted so that the end surface of the inclined surface 23c side of these fibers 21 and 22 forms the same surface as the inclined surface 23c, and the antireflection film is formed at need.

Figure 10:
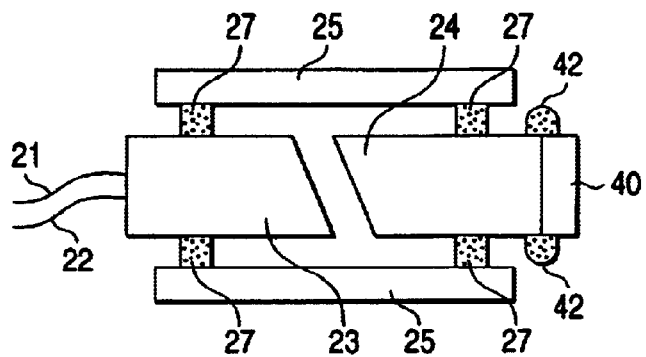
FIG. 10 is a sectional view showing a collimator.

Next, as shown in FIG. 10, the rod lens 24 on which the wavelength band-pass filter is fixedly adhered, and fiber holder 23 are inserted into the inside holder 25. At the time, the relative position of each component is adjusted so that the light incident from the transmission path terminal fiber 21 reaches the wavelength band-pass filter 40 through the rod lens 24, and the light reflected on the wavelength band-pass filter 40 is introduced into the reflection terminal fiber 22 through the rod lens 24. Then, the rod lens 24 and fiber holder 23 and the inner surface of the inside holder 25 are fixed by using the adhesive agent 27, and the first collimator 20 is formed. In the same procedure, the second collimator 30 is produced.

Further, the first collimator 20 and the second collimator 30 are inserted into the outside holder 50. In this case, the relative position of the components is adjusted so that the light which is introduced from the transmission path terminal fiber 21 of the first collimator 20 and transmits the wavelength band-pass filter 40, is introduced into the pass terminal fiber 32 of the second collimator. Then, when the first collimator 20 and the second collimator 30 are fixed on the inner surface of the outside holder 50, the optical multi/demultiplexer 10 according to the present invention can be obtained.

In the process as described above, when the fiber holder 23, inside holder 25 and outside holder 50 are formed of a transparent material of glass, the alignment of the center of components can be conducted to some extent by visual observation, and while preventing the parts from being contacted to each other, the alignment can be easily conducted in a short time. Further, when the above members are formed of glass, as the adhesive agents 27 and 52, the light hardening resin which is hardened by the light transmitted through the above members is used, and the fixing of the member can be conducted when the light is irradiated from the outside. Thereby, the heat processing on the optical parts is not necessary, and the fixed contacting can be conducted in a short time.

As such the light hardening resin, the ultraviolet hardening resin of epoxy or acrylate series can be listed, however, in order to prevent the member from dislocating of the alignment of the center by the contraction accompanied by the hardening of the adhesive agent, the adhesive agent whose hardening contraction rate is small, normally, which has hardening contraction rate not larger than 4%, is used. In this connection, in the above process, in each of adhered portions, the same adhesive agent may be used, or the different adhesive agent may be used.

Next, the mode of operation of the optical multi/demultiplexer 10 having the above structure will be described.

Initially, when demultiplexing of the light is conducted, the optical signal including a plurality of light having the different wavelength is introduced into the optical multi/demultiplexer 10 by the transmission path terminal fiber 21. This optical signal is emitted from the inclination surface 23c side of the fiber holder 23, and collimated by the rod lens 24, and introduced into the wavelength band-pass filter 40. In this optical signal, the light having the specific wavelength transmits the wavelength band-pass filter 40. The light transmitted through the wavelength band-pass filter 40 is converged by the rod lens 24 of the second collimator 30, and guided to the pass terminal fiber 32 held by the fiber holder 23, and taken out.

On the one hand, in the optical signal guided to the wavelength band-pass filter 40, the light having the other wavelength is reflected by the wavelength band-pass filter 40. This light is converged by the rod lens 24 of the first collimator 20, and is guided to the reflection terminal fiber 22 held by the fiber holder 23, and taken out.

Next, when the light is multiplexed, the optical signal to be multiplexed is guided to the optical multi/demultiplexer 10 respectively form the reflection terminal fiber 22 and the pass terminal fiber 32. The light guided from the reflection terminal fiber 22, is emitted from the inclination surface 23c side of the fiber holder 23, and collimated by the rod lens 24, and guided to the wavelength band-pass filter 40. In this optical signal, the light reflected by the wavelength band-pass filter 40 is converged by the rod lens 24, and guided to the transmission path terminal fiber 21 held by the fiber holder.

On the one hand, the light guided from the pass terminal fiber 32 is emitted from the inclined surface side of the fiber holder 23, and collimated by the rod lens 24, and guided to the wavelength band-pass filter 40. In this light, the light transmitted through the wavelength band-pass filter 40 is converged by the rod lens 24, and guided to the transmission path terminal fiber 21 held by the fiber holder 23, and multiplexed with the light reflected by the wavelength band-pass filter 40, and taken out to the outside.

According to the optical multi/demultiplexer 10 according to the present invention, when the groove portion 40g is formed on the closely contacted surface of the wavelength band-pass filter 40, because the adhesive agent before hardening penetrated in the closely contacted surfaces of the wavelength band-pass filter 40 and the rod lens 24 is stayed in this groove portion 40g, it is prevented that the adhesive agent reaches the central portion which is the light path, and interrupts the light path. Further, when the adhesive agent 42 penetrated on the closely contacted surface is expanded and contracted by the temperature change under the using environment, the expanded and the contracted portion can be absorbed in the groove portion 40g. Accordingly, the optical multi/demultiplexer 10 in which the loss of the light is small, can be provided.

Further, when the fiber holder 23, inside holder 25, and outside holder 50 are formed of the material whose thermal expansion property is low, such as glass, it is prevented that the position dislocation of each component occurs by the temperature change under the using environment. Accordingly, the light synthesizing and demultiplexing can be stably conducted.

Figure 11:
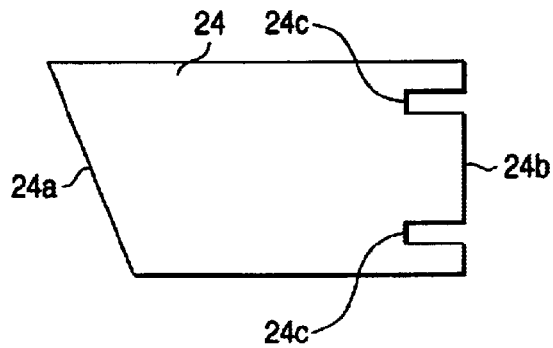
FIG. 11 is a sectional view showing a rod lens used in a modified example of the first embodiment of the optical multi/demultiplexer according to the present invention.
Figure 12:
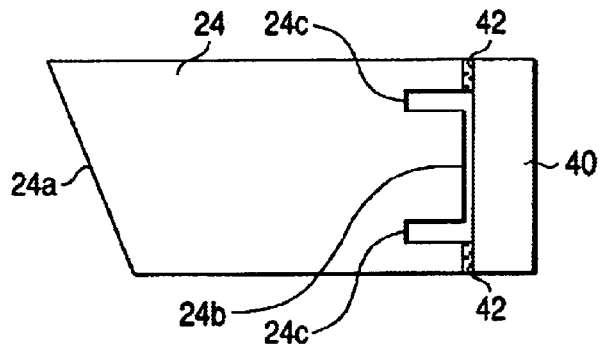
FIG. 12 is a sectional view showing a condition that the wavelength band-pass filter is jointed to the rod lens used in a modified example of the first embodiment of the optical multi/demultiplexer according to the present invention.
Figure 13:
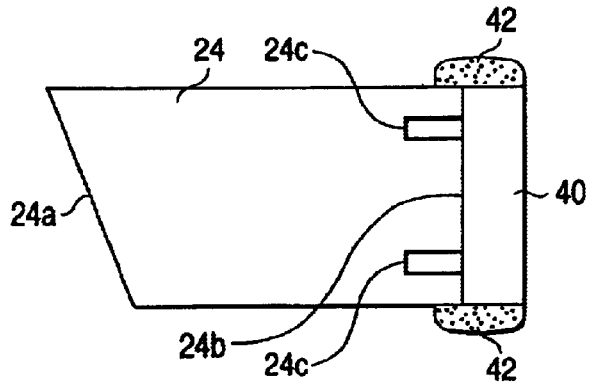
FIG. 13 is a sectional view showing another condition that the wavelength band-pass filter is jointed to the rod lens used in a modified example of the first embodiment of the optical multi/demultiplexer according to the present invention.

In the above described embodiment, the groove portion 40g is formed in the wavelength band-pass filter 40, however, as shown in FIG. 11, the groove portion 24c may be formed on the closely contacted surface of the rod lens 24. In this case, the wavelength band-pass filter 40 is, as shown in FIG. 12, closely contacted to the rod lens 24 by the adhesive agent 42 coated outside the groove portion 24c of the closely contacted surface, or as shown in FIG. 13, closely contacted to the rod lens 24 by the adhesive agent coated on the outer peripheral surface of the closely contacted surface.

Next, another embodiment of the optical multi/demultiplexer according to the present invention will be described. In the next embodiment, relating to the structure except for the wavelength band-pass filter and rod lens, because it is the same as the first embodiment, only the wavelength band-pass filter and the rod lens will be described, and the explanation of the other components will be neglected.

Figure 14:
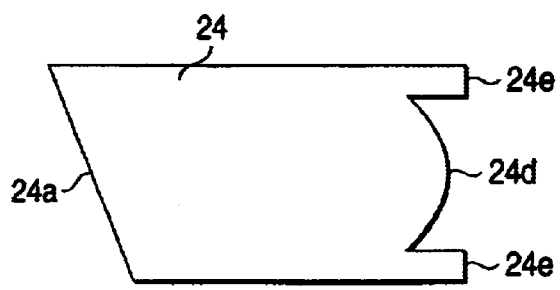
FIG. 14 is a sectional view showing the rod lens used in the second embodiment of the optical multi/demultiplexer according to the present invention.
Figure 15:
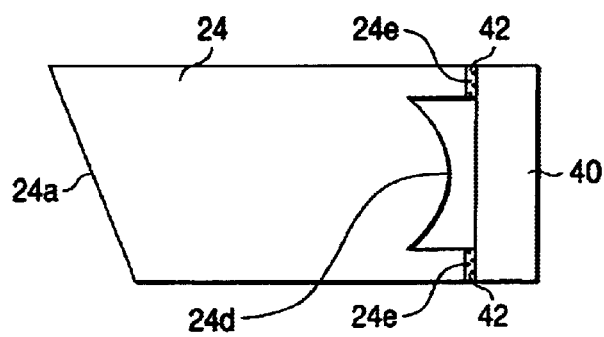
FIG. 15 is a sectional view showing a condition that the wavelength band-pass filter is jointed to the rod lens used in the second embodiment of the optical multi/demultiplexer according to the present invention.
Figure 16:
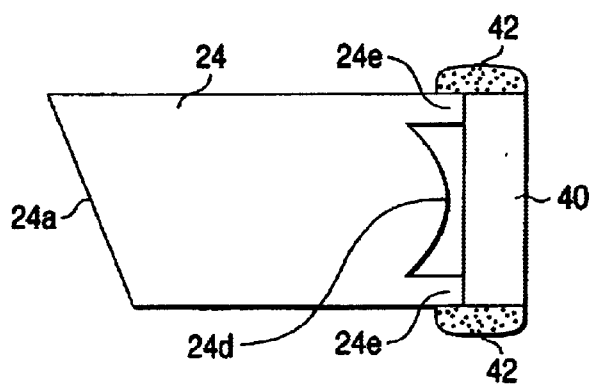
FIG. 16 is a sectional view showing another condition that the wavelength band-pass filter is jointed to the rod lens used in the second embodiment of the optical multi/demultiplexer according to the present invention.

FIG. 14 to FIG. 16 show the rod lens 24 and wavelength band-pass filter 40 used in the second embodiment of the optical multi/demultiplexer according to the present invention. On the opposite surface (closely contacted surface) of the inclination surface 24a of this rod lens 24, the convex surface 24d of spherical surface or aspherical surface to conduct the converging or collimating of the incident light is formed, and the refractive index distribution is not formed. On the outer periphery of the convex portion 24d, a ring-like flat portion 24e which protrudes to the outside of the longitudinal direction is formed, and between the convex surface 24d and the flat portion 24e, the groove-like connection portion is formed.

In the optical multi/demultiplexer of the present embodiment, the wavelength band-pass filter 40 is, as shown in FIG. 15, closely contacted to the rod lens 24 by the adhesive agent 42 coated on the flat portion 24e of the closely contacted surface, or as shown in FIG. 16, closely contacted to the rod lens 24 by the adhesive agent 42 coated on the outer peripheral surface of the closely contacted surface.

According to the optical multi/demultiplexer of the present embodiment, when the adhesive agent coated on the outer peripheral surface of the rod lens 24 and the wavelength band-pass filter 40, or flat portion 24e of the rod lens 24 is entered into the closely contacted surfaces, the adhesive agent 42 stays in the connection portion between the convex surface 24d and flat portion 24e, and does not reach the central portion of the convex surface 24 including the optical axis. Further, when the adhesive agent entered into the closely contacted surfaces is expanded and contracted, the expansion and contraction can be absorbed in the connection portion. Accordingly, an optical multi/demultiplexer having small light loss can be provided.

Figure 17:
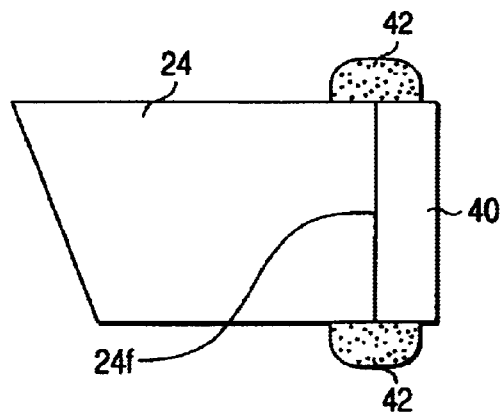
FIG. 17 is a sectional view showing a condition that the wavelength band-pass filter is jointed to the rod lens used in the third embodiment of the optical multi/demultiplexer according to the present invention.
Figure 18:
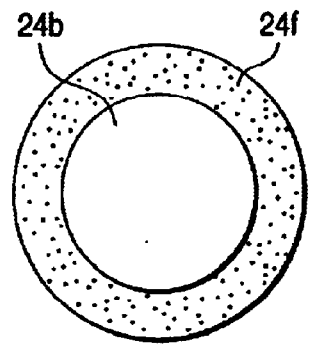
FIG. 18 is an end surface portion showing the rod lens used in the third embodiment of the optical multi/demultiplexer according to the present invention.

FIG. 17 and FIG. 18 show a rod lens 24 and wavelength band-pass filter 40 used in the third embodiment of the optical multi/demultiplexer according to the resent invention.

On the vertical surface 24b as the closely contacted surface of the rod lens 24 of this optical multi/demultiplexer, a coating 24f to prevent the adhesive agent 42 from entering is formed around the central area including the optical path. As this coating 24f, the material whose wet property is low, for example, Teflon can be used. In such a rod lens 24, for example, the masking is formed at the central area which is the optical path of the vertical surface 24b, and after the coating is conducted on the vertical surface 24b, when the masking is removed, the rod lens 24 can be formed.

According to the optical multi/demultiplexer of the present embodiment, because the coating 24f is formed around the central area including the optical path of the vertical surface 24b of the rod lens 24, it is prevented that the adhesive agent 42 coated on the outer periphery of the closely contacted surfaces of the rod lens 24 and the wavelength band-pass filter 40 enters into the central area of the closely contacted surfaces. Accordingly, an optical multi/demultiplexer having the small loss of the light can be provided.

Figure 19:
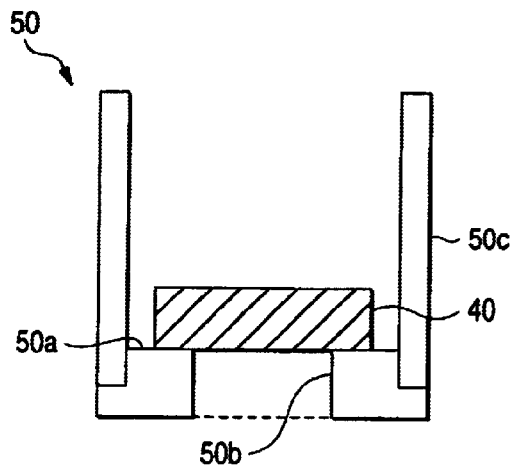
FIG. 19 is a sectional view showing the wavelength band-pass filter and a jointing folder used in the fourth embodiment of the optical multi/demultiplexer according to the present invention.
Figure 20:
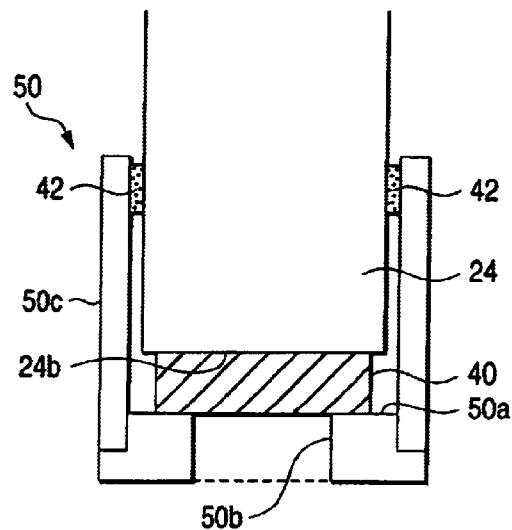
FIG. 20 is a sectional view showing a condition that the wavelength band-pass filter and the rod lens used in the fourth embodiment of the optical multi/demultiplexer according to the present invention are jointed.

FIG. 19 and FIG. 20 show the rod lens 24 and the wavelength band-pass filter 40 used in the fourth embodiment of the optical multi/demultiplexer according to the present invention.

This optical multi/demultiplexer is provided with a joining holder 50 to closely contact the wavelength band-pass filter 40 to the rod lens 24.

The joining holder 50 is a cylindrical member whose one end is opened, and its inner diameter is set slightly larger than the outer diameter of the light wavelength band-pass filter 40 and the rod lens 24. The bottom portion of the joining holder 50 is a placlosely contact portion 50a to position the wavelength band-pass filter 40 and place it, and in the center of this placlosely contact portion 50a, a through-hole 50b to expose the central area which is an optical path of the wavelength band-pass filter 40, to the outside, is formed. Then, the cylindrical portion 50c is stood from the placlosely contact portion 50a.

In the above joining holder 50, the wavelength filter 40 is, as shown in FIG. 19, placed on the placlosely contact portion 50a of the joining holder 50. Then, the rod lens 24 is, as shown in FIG. 20, inserted into the cylindrical portion 50c so that its vertical surface 24b is closely contacted with the closely contacted surface of the wavelength band-pass filter 40. The outer peripheral surface of this rod lens 24 is adhered to the inner surface of the cylindrical portion 50c by the adhesive agent 42 at the position separated from the closely contacted surface. Thereby, the wavelength bandpass filter 40 is fixed under the sandwiched condition between the placlosely contact portion 50a and rod lens 24.

According to the optical multi/demultiplexer of the present embodiment, the wavelength band-pass filter 40 is held under the sandwiched condition between the joining holder 50 and the rod lens 24, and the adhesive agent 42 is coated on the inner surface of the fixed holder 50 and the rod lens 24 at the separated position, and is not coated in the vicinity of the closely contacted surfaces of the rod lens 24 and the wavelength band-pass filter 40. Accordingly, the adhesive agent 42 does not penetrate into the closely contacted surfaces of the rod lens 24 and the wavelength band-pass filter 40.

Further, because the joining of the wavelength band-pass filter 40 and the rod lens 24 can be conducted in the cylindrical joining holder 50, the accuracy of the positioning of the wavelength band-pass filter 40 and the rod lens 24 is heightened, and the loss of the light can be reduced.

Figure 21:
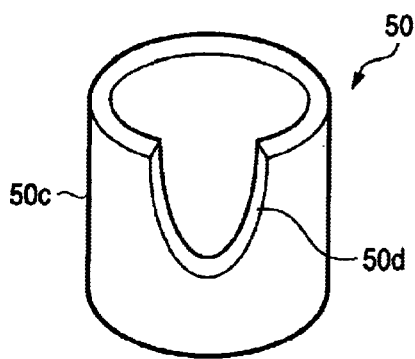
FIG. 21 is a perspective view showing another example of the jointing holder used in the fourth embodiment of the optical multi/demultiplexer according to the present invention.
Figure 22:
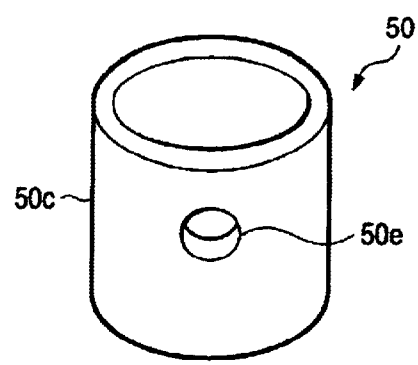
FIG. 22 is a perspective view showing another example of the jointing holder used in the fourth embodiment of the optical multi/demultiplexer according to the present invention.

In the joining holder 50 described above, a cutout portion 50d as shown in FIG. 21, or through-hole 50e as shown in FIG. 22 is formed, and it may also be allowable that, from this cutout portion 50d or through-hole 50e, the adhesive agent 42 is filled between the rod lens 24 and the joining holder 50.

Figure 23:
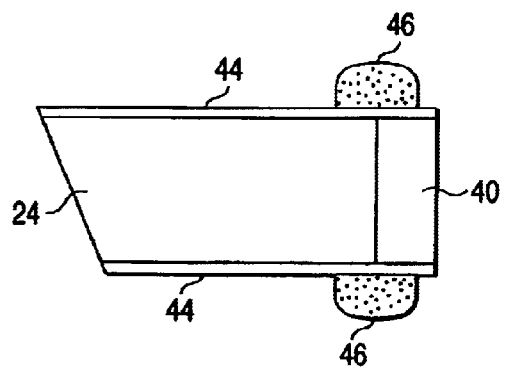
FIG. 23 is a sectional view showing a condition that the wavelength band-pass filter is jointed to the rod lens used in the fifth embodiment of the optical multi/demultiplexer according to the present invention.

FIG. 23 shows the rod lens and the wavelength band-pass filter used in the fifth embodiment of the optical multi/demultiplexer according to the present invention. In the optical multi/demultiplexer of the present embodiment, a metallic film 44 is formed on the outer peripheral surface of the rod lens 24 and the wavelength band-pass filter 40, and the rod lens 24 and the optical filter is jointed by a solder 46 provided on the metallic film 44. As such the metallic film 44, is not particularly limited when the joining by the solder is possible, and from the viewpoint of the joining strength, the laminated film of chrome and gold is used. Such the laminated film 44 is, normally, formed by the method of evaporation.

A method by which the metallic film 44 is evaporated on the outer peripheral surface of the rod lens 24 and the wavelength band-pass filter 40, will be described later.

Figure 24:
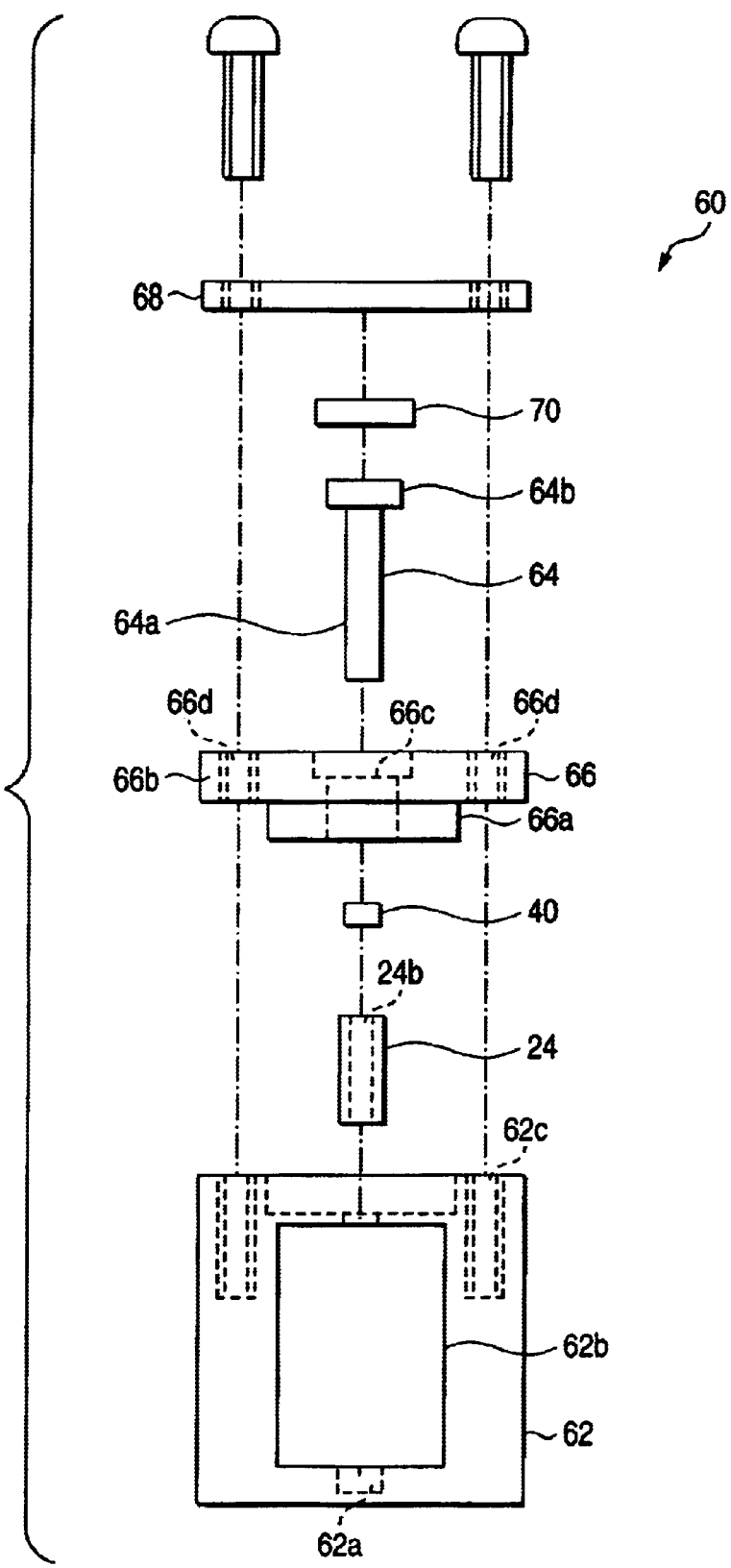
FIG. 24 is an exploded view showing an evaporation tool used in the fifth embodiment of the optical multi/demultiplexer according to the present invention.

FIG. 24 is a evaporation tool 60 to evaporate the metallic film on the rod lens 24 and the wavelength band-pass filter 40. This evaporation tool 60 is provided with a fixed holder 62 by which the rod lens 24 is fixed and held, a pressure rod 64 to press the wavelength band-pass filter 40 onto the rod lens 24, a guide member 66 to guide the pressure rod 64, a pressure cover 68 to press the pressure rod 64 and close out the fixed holder 62, and a damper member 70 arranged between the pressure rod 64 and the pressure cover 68.

The fixed holder 62 is a cylindrical member whose one end is opened, and in its bottom portion, a fixed hole 62a into which one end of the rod lens 24 is inserted and fixed, and 4 window portions 62b to expose the closely contacted surface of the rod lens 24 and the wavelength band-pass filter 40 to the outside are formed. On the upper end surface of the outer peripheral portion of the fixed holder 62, a screw hole 62c is formed.

A guide member 66 is a lid-like member to close out the opening of the fixed holder 62, and provided with an engagement portion 66a to be engaged with the opening of the fixed holder 62, and a base portion 66b to close out the opening of the fixed holder 62. In the center of the base portion 66b, a guide hole 66c into which the pressure rod 64 is inserted, is formed. Further, in the peripheral edge portion of the base portion 66b, a screw hole 66d corresponding to the screw hole 62c of the fixed holder 62 is formed.

The pressure rod 64 is provided with a rod portion 64a which is inserted into the fixed holder 62 through the guide hole 66c formed in the guide member 66, and the base portion 64b which is positioned at the outside of the guide member 66.

The pressure cover 68 is a lid-like member which presses the base portion 64b of the pressure rod 64 positioned at the outside of the guide member 66 onto the base portion direction of the fixed holder 62, and closes out the fixed holder 62. In the peripheral edge portion of the pressure cover 68, a screw hole corresponding to the screw hole 62c of the fixed holder 62 is formed.

The damper member 70 is inserted between the pressure cover 68 and the pressure rod 64, and when the pressure rod 64 is pressed by the pressure cover 68, gives the damper effect. As the damper member 70, for example, gelatinous material can be used.

When the metallic film is evaporated by using the evaporation tool 60 as described above, the rod lens 24 is fixed so that the end portion of the opposite side of the closely contacted surface is inserted into the fixed hole 62a formed in the bottom portion of the fixed holder 62, and the closely contacted surface is positioned on the upper portion of the vertical surface 24b. When, on the closely contacted surface of this rod lens 24, the wavelength band-pass filter 40 is placed, the closely contacted surface of the rod lens 24 and the wavelength band-pass filter 40 is in the condition that it is exposed to the outside from the window portion 62b of the fixed holder.

In this condition, the guide member 66 is engaged with the opening of the fixed holder 62, and the pressure rod 64 is inserted from the guide hole 66c of the guide member 66. Thereby, the leading edge of the rod portion 64a of the pressure rod 64 is in the condition that it is in contact with the wavelength band-pass filter 40 arranged on the closely contacted surface of the rod lens 24.

Figure 25:
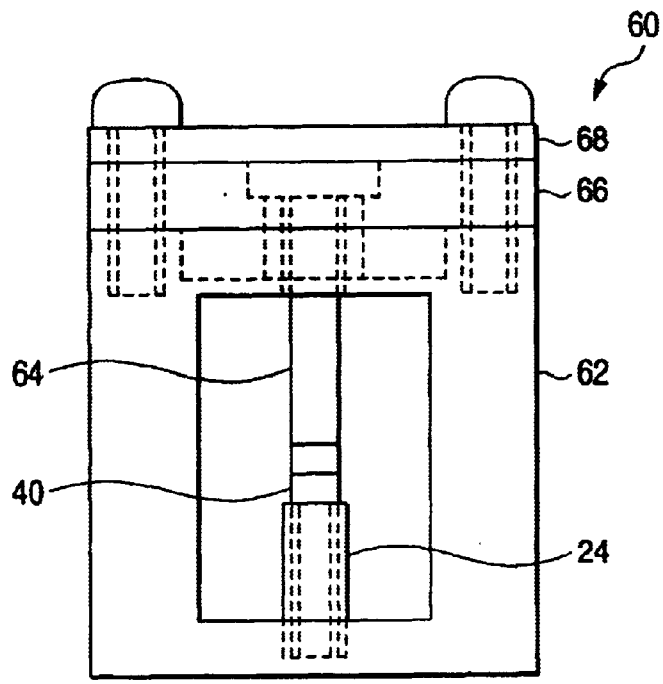
FIG. 25 is a front view showing the evaporation tool used in the fifth embodiment of the optical multi/demultiplexer according to the present invention.

Then, in the condition that the base portion 64b of the pressure rod 64 is pressed by the pressure cover 68 through the damper member 70, the pressure cover 68, guide member 66 and fixed holder 62 are fixed by inserting the fixing screw (not shown)into the screw hole. Thereby, the wavelength band-pass filter 40 is, as shown in FIG. 25, fixed under the condition of being pressed onto the closely contacted surface of the rod lens 24.

In this condition, when the evaporation tool 60 is arranged in the evaporation apparatus and conducts the evaporation process, the metallic film is evaporated on the closely contacted surfaces of the rod lens 24 and the wavelength band-pass filter 40 which is exposed from the window portion 62b of the fixed holder 62. At this time, on a portion on which the metallic film is not formed, masking may be conducted by the tape.

According to the optical multi/demultiplexer according to the present invention, because the metallic film 44 is formed on the outer peripheral surface of the closely contacted surface of the rod lens 24 and the wavelength band-pass filter 40, even when the adhesive agent is coated on the outer peripheral portion, the adhesive agent is prevented from entering into the closely contacted surface. Further, because the outer peripheral portion is covered by the metallic film 44, in order to closely contact the rod lens and the optical filter, a solder whose mechanical strength is high and whose thermal expansion is low, can be used.

Next, an optical signal separation apparatus and an optical signal combination apparatus using the optical multi/demultiplexer described above, will be described below. These optical signal separation apparatus and the optical signal combination apparatus have the structure in which a plurality of optical multi/demultiplexers having the wavelength band-pass filter in which the transmission wavelength band is different, are jointed. These optical signal separation apparatus and the optical signal combination apparatus can be structured by using any one of optical multi/demultiplexers of the examples 1–5 described above.

Figure 26:
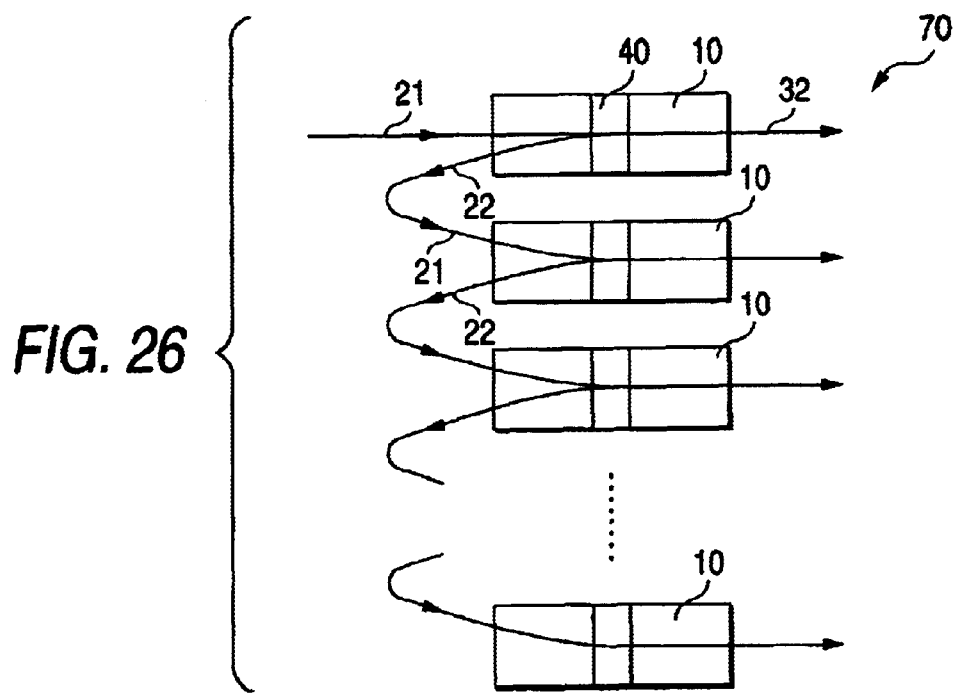
FIG. 26 is a sectional view showing an outline of an optical signal separation apparatus according to the present invention.

FIG. 26 shows the optical signal separation apparatus. In the optical signal separation apparatus 70, the reflection terminal fiber 22 of the preceding optical multi/demultiplexer is jointed to the transmission path terminal fiber 21 of the subsequent optical multi/demultiplexer in series such that the reflection terminal fiber 22 of the first optical multi/demultiplexer 10 is jointed to the transmission path terminal fiber 21 of the second optical multi/demultiplexer 10, and the reflection terminal fiber 22 of the second optical multi/demultiplexer 10 is jointed to the transmission path terminal fiber 21 of the third optical multi/demultiplexer 10. Thereby, the optical signal including the light of a plurality of wavelength bands supplied from the transmission path terminal fiber 21 of the first optical multi/demultiplexer 10 is demultiplexed to the light of respective wavelength band, and can be taken out from the each pass terminal fiber 32.

Figure 27:
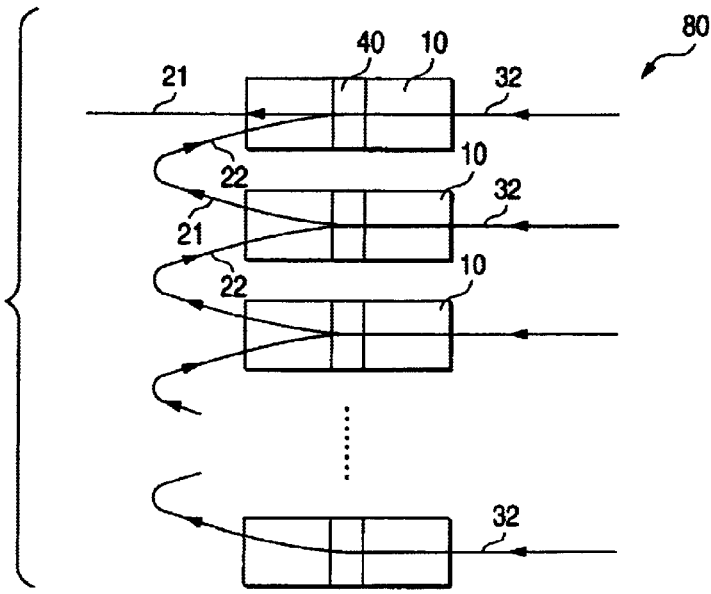
FIG. 27 is a sectional view showing an outline of the optical signal combining apparatus according to the present invention.

FIG. 27 shows the optical signal combination apparatus. In this optical signal combination apparatus, the transmission path terminal fiber 21 of the subsequent optical multi/demultiplexer 10 is jointed to the reflection terminal fiber 22 of the preceding optical multi/demultiplexer 10 in series such that the transmission path terminal fiber 21 of the second optical multi/demultiplexer 10 is jointed to the reflection terminal fiber 22 of the first optical multi/demultiplexer 10, and the transmission path terminal fiber 21 of the third optical multi/demultiplexer 10 is jointed to the reflection terminal fiber 22 of the second optical multi/demultiplexer 10. Thereby, when the light of specific wavelength is introduced from respective pass terminal fibers 32, the optical signal in which these are multiplexed can be taken out from the transmission path terminal fiber 21 of the first optical multi/demultiplexer.

Next, as another example of the light filter module according to the present invention, a light equalizer will be described. This light equalizer is used to average a gain when the gain of the light amplified by the light amplifier such as a optical fiber amplifier, is not constant to the wavelength.

Figure 28:
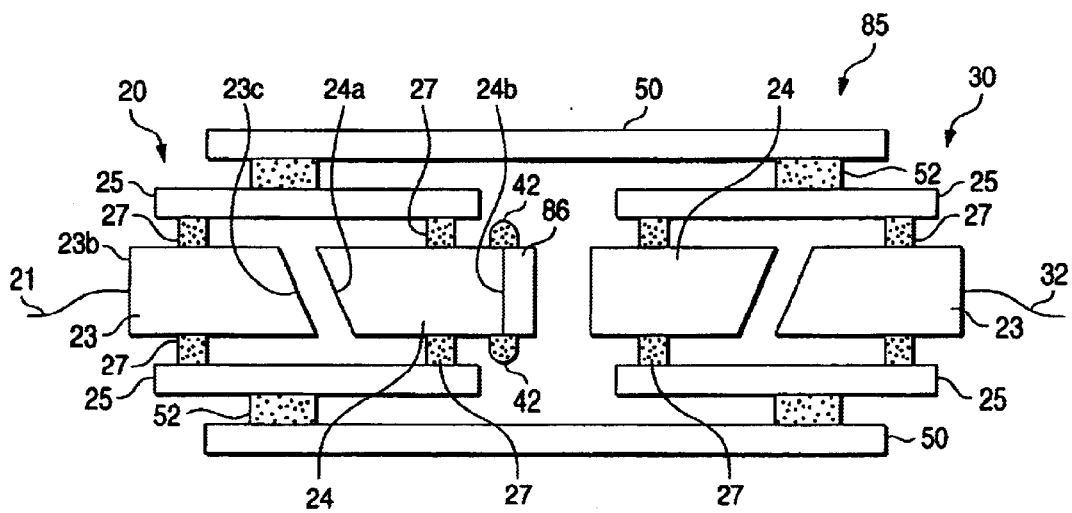
FIG. 28 is a sectional view showing an outline of a light equalizer according to the present invention.
Figure 29:
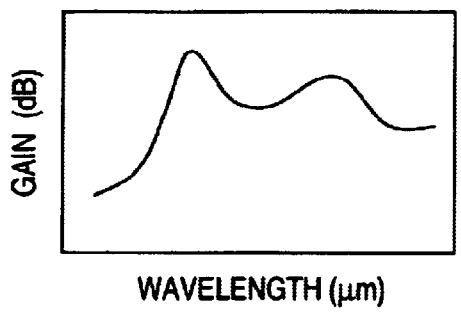
FIG. 29 is a graph showing a gain of the optical signal to be equalized.
Figure 30:
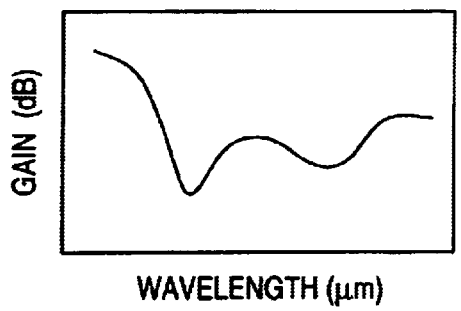
FIG. 30 is a graph showing a gain of an equalizing filter.
Figure 31:
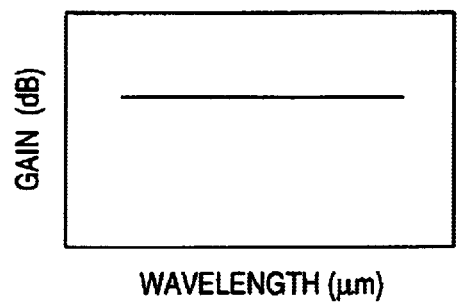
FIG. 31 is a graph showing a gain of the equalized optical signal.
Figure 32:
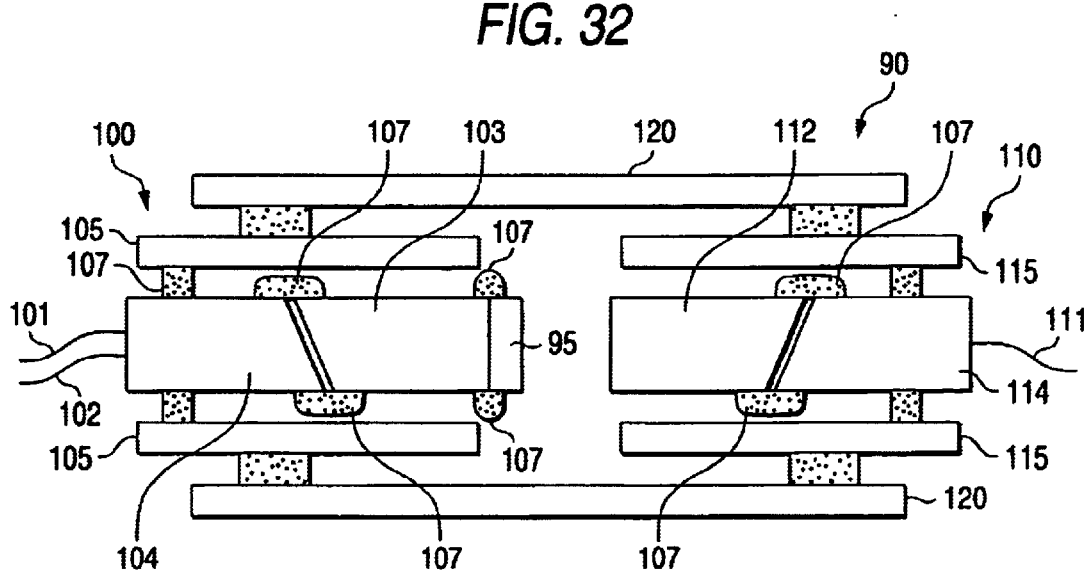
FIG. 32 is a sectional view showing an outline of the conventional optical multi/demultiplexer.

FIG. 28 shows the light equalizer according to the present invention. In the first collimator 20 which is the first optical system of a light equalizer 85, a transmission terminal fiber 21 on which the light to be equalized is transmitted is provided. Further, on the vertical surface 24b of the rod lens 24 of the first collimator 20, an equalizing filter 86 to equalize the light transmitted to the first collimator is provided. As this equalizing filter 86, a filter having the reversal gain curve to the gain curve of the light amplifier is used. For example, when the light from the light amplifier having the gain curve shown in FIG. 29, is equalized as shown in FIG. 31, as the equalizing filter 86, a filter having the gain curve as shown in FIG. 30 is used. As such the light equalizing filter, in the same manner as the light band-pass filter, the dielectric multi-film filter can be used. The transmission characteristic of the light of the dielectric multi-film filter can be adjusted by changing the film thickness of each layer of the multi-film. This light equalizing filter 86 has the same structure as any one of the first embodiment to the fifth embodiment of the optical multi/demultiplexer and is closely contacted onto the rod lens 24.

In such the light equalizer 85, the light amplified by the light amplifier is guided to the light equalizer 85 by the light transmission path terminal fiber 21. The light is emitted from the inclined surface side of the fiber holder 23, collimated by the rod lens 24 and guided to the equalizing filter 86. When the light transmits the equalizing filter 86, the gain of the light is equalized. The light transmitted the equalizing filter 86 is converged by the rod lens 24, guided to the pass terminal fiber 32 held by the fiber holder 23, and is taken out. According to the present invention, the light equalizer having the small loss of light can be provided.

The present invention is not limited to the above example, but can be used by being appropriately modified. For example, the optical filter module of the present invention is not only for the optical multi/demultiplexer or a light equalizer, but can also be used for a light splitting module which transmits the light of specific rate in the supplied light and by which the remaining light is reflected and split. This light splitting module can be used for a case where the light is monitored in the optical system. Further, the optical filter module according to the present invention can be structured by appropriately combining the structures described above.

EXAMPLES

By examples, the present invention will be more detailed below.

Example 1

As an example of the present invention, the optical multi/demultiplexer shown in FIG. 1 is produced. As the rod lens, a 0.23 pitch glass refractive index distribution lens (1.8 mm φ, 4.4 mm length) whose one end is a vertical surface and the other end is an inclined surface which is polished to 8° to the surface perpendicular to the optical axis, and on both end surfaces, the antireflection film is formed, is used.

As the wavelength band-pass filter, a dielectric multi-film filter (dimension 1.4×1.4 mm, the thickness is 1 mm) by which the light of the central wavelength 1550 nm is transmitted, and the other light is reflected, is used. In the inside of about 300 μm from 4 sides of the outer periphery of the closely contacted surface of this filter and the rod lens, 4 V-shaped (the width is 100 μm, the depth is 50 μm)grooves are formed by using the diamond blade.

This filter is closely contacted with the vertical surface of the rod lens, and on several portions of the outside of the closely contacted surface, the epoxy ultraviolet hardening adhesive agent is coated, and the ultraviolet ray is irradiated, and the adhesive agent is hardened.

As the transmission path terminal fiber and the reflection terminal fiber, an optical fiber in which the primary sheath and the secondary sheath of a predetermined length (20 mm) from the leading edge of the quartz single mode fiber (made by Corning Co., SMF 28) of a clad diameter of 125 μm, core diameter 10 μm, are removed and washed, is used. This optical fiber is inserted into the cylindrical boro-silicated glass fiber holder (the outer diameter is 1.8 mmφ, the length is 11 mm) having a through-hole whose cross section is square (214 μm×214 μm) in a center, and the epoxy thermal hardening type adhesive agent is filled in the through-hole and is hardened and fixed. This one end surface is polished to an angle of 8° to the surface perpendicular to the optical axis, and the antireflection film is formed on the polished surface.

These rod lens and fiber holder are inserted into Pyrex glass cylindrical inside holder (the outer diameter is 3 mm, inner diameter is 1.85 mm, thickness is 0.58 mm, length is 8 mm), and the rod lens and fiber holder are respectively fixed by using the ultraviolet hardening type adhesive agent, and the first collimator is formed.

On the one hand, as the pass terminal fiber, the optical fiber described above is used, and is inserted into a cylindrical boro-silicated glass fiber holder (the outer diameter is 1.8 mm φ, inner diameter is 126 μmφ, length is 6 mm) having the through-hole whose cross section is circular, in a center, and the epoxy thermo-hardening type adhesive agent is filled into the through-hole, and is hardened, and the optical fiber is fixed. Its one end surface is polished to an angle of 8° to the surface perpendicular to optical axis, and the antireflection film is formed on the polished surface. The same things as this fiber holder and the rod lens described above, are inserted into the same thing as the inside holder described above, and fixed by using the ultraviolet hardening type adhesive agent, and the second collimator is formed.

Next, the first collimator and the second collimator are opposed to each other, and inserted into the Pyrex glass holder (the outer diameter is 5 mm φ, inner diameter is 3.40 mm φ, thickness is 0.80 mm, length is 13 mm), and their center is aligned, and the outer periphery of the inside holder of each collimator is fixed on the inner surface of the outside holder by the epoxy ultraviolet hardening type adhesive agent. The thermal expansion coefficient of the above-described Pyrex glass inside holder and outside holder is about $3 \times 10^{-6}$/K. Thereby, the optical multi/demultiplexer shown in FIG. 1 is obtained.

Example 2

As the rod lens, a rod lens (1.8 mm φ, 3.4 mm long), as shown in FIG. 14, whose one end surface is an inclined surface polished to 8° to the optical axis, and on whose both end surfaces, the antireflection film is formed, and which has no refractive index distribution is used. On the other end side end surface, which is polished to 8°, of this rod lens, an aspherical convex surface is formed, and on the periphery of the circle which is not the optical path, around the convex surface, a flat portion is formed so that its height is the same height as the highest potion of the convex surface. This flat portion is, when viewed from the filter closely contacted side end surface, is formed on the ring to the extent of the range of the 0.37 mm inside than the outer periphery of the lens. Then, the curved surface of the lens is designed so that the focus is formed on the 140 μm outside from the inclined surface.

A dielectric multi-film filter type wavelength dividing filter (dimension 1.4×1.4 mm, thickness 1 mm) by which the light of the central wavelength 1550 nm is transmitted, and the other light is reflected, is closely contacted with the flat portion of this lens, and on the outside of the close contact portion, as shown in FIG. 6, the epoxy ultraviolet hardening type adhesive agent is coated at the several portions, and the ultraviolet ray is irradiated and the adhesive agent is hardened. Other than that, in the same manner as in Example 1, the optical multi/demultiplexer is obtained.

Example 3

The same lens as in Example 1 is used, and the vertical surface of the lens is washed by alcoholic, and masking is conducted in the range of the radius of 0.5 mm from the optical axis center in the vertical surface. The masking is conducted in such a manner that the UV peeling sheet is cut into the circle of the diameter of 1 mm, and adhered onto the lens end surface. Teflon coat (Tetra-fluoro ethylene resin: TFT coat made by Fine Chemical Japan Co.), is coated by the spraying so that the thickness is 5 μm, on a portion on which no masking is conducted (a ring-like area of about 400 μm inside from the outer periphery), of this end surface.

As the wavelength band-pass filter, the dielectric multi-film filter (dimension 1.4×1.4 mm, thickness 1 mm) by which the light of the central wavelength 1550 nm is transmitted, and the other light is reflected, is used, and this filter is closely contacted with the end surface of the lens of the side on which Teflon coating is conducted, and the epoxy ultraviolet hardening type adhesive agent is coated on the outside of the close contact portion at the several portions, and the ultraviolet ray is irradiated and the adhesive agent is hardened. Other than that, in the same manner as in Example 1, the optical multi/demultiplexer is obtained.

Example 4

As the bottom portion of the jointing holder shown in FIG. 19 and FIG. 20, a material in which a angular groove of 1.5 mm angle and depth of 0.2 mm is formed on the upper surface central portion of the stepped glass ring-like plate (for the size, refer to the drawing), and an opening portion of 0.7 mm φ is formed at the central portion, is prepared.

On the angular groove of the holder bottom portion, the dielectric multi-film filter type wavelength dividing filter (dimension 1×1 mm, thickness 1 mm) by which the light of the central wavelength 1550 nm is transmitted, and the other light is reflected, is arranged.

Further, as a wall portion of the jointing holder, a cylindrical glass casing (outer diameter 3 mm φ, inner diameter 1.8 mm φ, length 3 mm) is prepared. This side wall portion is covered on the bottom portion on which the filter is arranged, and the contact portion of the bottom portion and the side wall portion is fixed by using a small amount of thermal hardening epoxy adhesive agent, and the jointing holder is obtained. Next, in the side surface portion of this jointing holder, the vertical surface side of the rod lens in the same manner as in Example 1, is inserted, and from the lens upper portion, under the slightly pressured condition, the lens end surface and the filter is closely contacted. While maintaining this condition, the vicinity of the lens insertion port of the side wall portion, and the rod lens side surface, are fixed by the epoxy ultraviolet hardening type adhesive agent, and a unit in which the rod lens and the filter are integrated in the holder, is obtained.

The fixation of this unit onto the inside holder is conducted by fixing the rod lens of a portion protruded from the holder onto the inside holder. Other than this, in the same manner as in Example 1, the optical multi/demultiplexer is obtained.

The tool is set in such a manner that 2 mm area from the longest portion of the 8° polished end surface of the same refractive index distribution type rod lens as in Example 1 is inserted into the tool. By using the tool to press and fix under closely contacting condition the dielectric multi-film filter type wavelength dividing filter (dimension 1.4×1.4 mm, thickness 1 mm) by which the light of the central wavelength 1550 nm is transmitted, and the other light is reflected, and the end surface which is not 8° polished surface of the rod lens, in the condition that the lens and the filter are pressed and closely contacted with each other, Cr film of 0.4 μm is evaporated on the whole periphery of its side surface, and gold of 0.1 μm is evaporated thereon.

Then, a solder is placed on the outer periphery of the side surface of the surface on which the rod lens and filter are closely contacted, and after the lens and filter are fixed by soldering, the pressing and fixing tool is removed. In this manner, a unit in which the lens and filter are integrated, is obtained. The fixation of this unit onto the inside holder is conducted by adhering the side surface of the rod lens on which the evaporation is not conducted, and the inside holder inner surface by adhesive agent. Other than that, in the same manner as in Example 1, the optical multi/demultiplexer is produced.

COMPARATIVE EXAMPLE 1

Other than that the same rod lens and wavelength band-pass filter as in Example 1 are used, and the groove is not formed in the wavelength band-pass filter, and the vertical surface of the rod lens is closely contacted with the wavelength band-pass filter, and on its outer periphery, the epoxy ultraviolet hardening type adhesive agent is coated and fixed, the optical multi/demultiplexer is obtained in the same manner as Example 1.

(The Evaluation of the Jointing Body of the Filter and Rod Lens)

Forty jointing bodies of the rod lens and the wavelength band-pass filter by the methods described in Examples 1–5 and Comparative example 1 are prepared. These are observed from the filter side by the optical microscope, and the sample in which the adhesive agent does not penetrate in the range of the diameter of 600 μm around the optical axis of the lens, is made an acceptance, and a sample in which the adhesive agent penetrates in the range, is made a non-acceptance, and the yield is found. The result is shown in Table 1.

TABLE 1

|  | Yield (%) |
| --- | --- |
| Example 1 | 95 |
| Example 2 | 95 |
| Example 3 | 80 |
| Example 4 | 85 |
| Example 5 | 85 |
| Comparative example 1 | 70 |

As can clearly be seen from Table 1, according to the method described in Examples, the penetration of the adhesive agent can be prevented when the wavelength band-pass filter and the rod lens are adhered to each other, and to Comparative example, the jointing body of the filter and rod lens can be produced at the higher yield. Accordingly, according to the present invention, it is clearly be seen that the expensive filter is not wasted, and the optical filter module can be produced at low cost.

(Evaluation of the Optical Multi/Demultiplexer)

The reflection loss and insertion loss under the environmental test of the optical multi/demultiplexer of Examples 1–5, and comparative example 1 are evaluated. The reflection loss is measured by introducing the light of 1550 nm into the optical multi/demultiplexer.

Further, the insertion loss is measured in such a manner that the sample is placed under the temperature variation environment from −40° C. to 85° C. by the environment tester, and the value of loss of the transmission of light from the transmission path terminal fiber to the pass terminal fiber is measured at every predetermined time. In the temperature change by the environment tester, the following 8 hours is made one cycle: sample holding at 20° C. for 1 hour→temperature rising to 85° C.→85° C. holding for 1 hour→temperature lowering to 20° C. in 1 hour→holding 20° C. for 1 hour→temperature lowering to −40° C. in 1 hour→holding −40° C. for 1 hour→temperature rising to 20° C. in 1 hour, and the insertion loss when the test of 10 cycles is conducted, is measured at every 10 minute. At this time, the maximum value of the variation amount of the insertion loss when the insertion loss before the sample is placed under the environment test is made 0 dB, is evaluated. As the sample of Comparative example 1, the optical multi/demultiplexer produced by using a unit which is unacceptable in the evaluation of the filter and rod lens jointing body described above, is used. This result is shown in Table 2.

TABLE 2

|  | Reflection loss (dB) | Maximum value of variation amount of insertion loss (dB) |
| --- | --- | --- |
| Example 1 | 0.4 | 0.3 |
| Example 2 | 0.4 | 0.3 |
| Example 3 | 0.4 | 0.3 |
| Example 4 | 0.4 | 0.3 |
| Example 5 | 0.4 | 0.3 |
| Comparative example 1 | 1.0 | 3.0 |

As clearly be seen from Table 2, it can be found that, when the adhesive agent penetrates in the optical path, the loss is greatly increased, and the variation amount of the insertion loss is also increased in the temperature cycle test. In such the manner, when the large loss exists, actually, the sample is difficult to be used as the optical multi/demultiplexer.

Accordingly, the unit in which the adhesive agent penetrates in the optical path is discarded, and the yield is lowered, thereby, the expensive filter becomes wasteful, and the cost is increased. From the above result, the effect of the present invention is clear.

As can clearly be seen from the above description, according to the present invention, the optical filter module in which the production is easy, the change of the performance due to temperature change is small, and the reliability for long period of use is high, can be provided. Further, when such the optical filter module is used, each kind of optical apparatus such as the optical multi/demultiplexer or light equalizer can be provided.

What is claimed is:

1. An optical filter module comprising:
an optical filter which selectively transmits, attenuates or reflects a light having a specific wavelength;
a first optical system which includes at least a first optical fiber to guide the light supplied to the optical filter, and a first lens to connect optically the first optical fiber with the optical filter, and
a second optical system which is oppositely provided to the first optical system through the optical filter, said second optical system including at least a second optical fiber to guide the light supplied from the optical filter, and a second lens to connect optically the optical filter with the second optical fiber, wherein
a lens surface of an end surface of the first optical system or the second optical system and a filter surface of an end surface of the optical filter, each including an optical path thereof, are bonded by adhesive agent coated on a portion apart from the optical path, further wherein
at least one of said lens surface and said filter surface, being opposed each other, includes at least one groove portion in said portion apart from the optical path which enables the adhesive agent penetrated through the bonded surfaces to stay therein, said groove portion being formed in such a way that penetration of the adhesive agent into the optical path can be blocked.

2. An optical filter module comprising:
an optical filter which selectively transmits, attenuates or reflects a light having a specific wavelength;
a first optical system which includes at least a first optical fiber to guide the light supplied to the optical filter, and a first lens to connect optically the first optical fiber with the optical filter, and
a second optical system which is oppositely provided to the first optical system through the optical filter, said second optical system including at least a second optical fiber to guide the light supplied from the optical filter, and a second lens to connect optically the optical filter with the second optical fiber, wherein
an end surface of the first optical system or the second optical system is comprised of a convex surface including a optical path and a flat portion protruding from a peripheral portion of the convex surface to an outside of the optical path direction, said flat portion being formed so as to protrude outwardly from the convex surface of which portion is a most distant from said peripheral portion, further wherein
said end surface and an end surface of the optical filter are bonded by adhesive agent coated on said flat portion.

3. An optical demultiplexer comprising:
an optical filter which selectively transmits only a light having a specific wavelength and reflects light having other wavelengths;
a first optical system which includes a first optical fiber to guide the light supplied to the optical filter and a second optical fiber to guide the light supplied from the optical filter, and a first lens to connect optically the first and second optical fibers with the optical filter, and
a second optical system which is oppositely provided to the first optical system through the optical filter, said second optical system including at least a third optical fiber to guide the light supplied from the optical filter, and a second lens to connect optically the optical filter with the third optical fiber, wherein
a lens surface of the first optical system and a filter surface of an end surface of the optical filter, each including an optical path thereof, are bonded by adhesive agent coated on a portion apart from the optical path, further wherein
at least one of said lens surface and said filter surface, being opposed each other, includes at least one groove portion in said portion apart from the optical path which enables the adhesive agent penetrated through the bonded surfaces to stay therein, said groove portion being formed in such a way that penetration of the adhesive agent into the optical path can be blocked.

4. An optical multiplexer comprising:
an optical filter which selectively transmits only a light having a specific wavelength and reflects light having other wavelengths;
a first optical system which includes at least a first optical fiber to guide the light supplied to the optical filter and a second optical fiber to guide the light supplied from the optical filter, and a first lens to connect optically the first and second optical fibers with the optical filter, and
a second optical system which is oppositely provided to the first optical system through the optical filter, said second optical system including at least a third optical fiber to guide the light supplied to the optical filter, and a second lens to connect optically the optical filter with the third optical fiber, wherein
a lens surface of the first optical system and a filter surface of an end surface of the optical filter, each including an optical path thereof, are bonded by adhesive agent coated on a portion apart from the optical path, further wherein
at least one of said lens surface and said filter surface, being opposed each other, includes at least one groove portion in said portion apart from the optical path which enables the adhesive agent penetrated through the bonded surfaces to stay therein, said groove portion being formed in such a way that penetration of the adhesive agent into the optical path can be blocked.

5. An optical demultiplexer comprising:
an optical filter which selectively transmits only a light having a specific wavelength and reflects light having other wavelengths;
a first optical system which includes at least a first optical fiber to guide the light supplied to the optical filter and a second optical fiber to guide the light supplied from the optical filter, and a first lens to connect optically the first and second optical fibers with the optical filter, and
a second optical system which is oppositely provided to the first optical system through the optical filter, said second optical system including at least a third optical
fiber to guide the light supplied from the optical filter,
and a second lens to connect optically the optical filter
with the third optical fiber, wherein
an end surface of the first optical system is comprised
of a convex surface including a optical path and a flat
portion protruding from a peripheral portion of the
convex surface to an outside of the optical path
direction, said flat portion being formed so as to
protrude outwardly from the convex surface of
which portion is a most distant from said peripheral
portion, further wherein
said end surface and an end surface of the optical
filter are bonded by adhesive agent coated on said
flat portion.

6. An optical multiplexer comprising:

an optical filter which selectively transmits only a light
having a specific wavelength and reflects light having
other wavelengths;

a first optical system which includes at least a first optical
fiber to guide the light supplied to the optical filter and
a second optical fiber to guide the light supplied from
the optical filter, and a first lens to connect optically the
first optical fiber with the optical filter, and a second optical system which is oppositely provided to
the first optical system through the optical filter, said
second optical system including at least a third optical
fiber to guide the light supplied to the optical filter, and
a second lens to connect optically the optical filter with
the third optical fiber, wherein
an end surface of the first optical system is comprised
of a convex surface including a optical path and a flat
portion protruding from a peripheral portion of the
convex surface to an outside of the optical path
direction, said flat portion being formed so as to
protrude outwardly from the convex surface of
which portion is a most distant from said peripheral
portion, further wherein
said end surface and an end surface of the optical
filter are bonded by adhesive agent coated on said
flat portion.

7. An optical demultiplexer according to claims 3 or 5, wherein
said optical demultiplexer is used for an optical signal
separation apparatus comprising a plurality of the optical demultiplexers, having wavelength band-pass filters
of which wavelength bands to transmit are different
from one another, further wherein
an optical fiber to guide a light supplied from a wavelength band-pass filter of an optical demultiplexer is
connected to another optical fiber to supply the light to
another wavelength band-pass filter of another optical
demultiplexer so that the light having a plurality of
wavelength bands is separated into a plurality of optical
signals, each corresponding to a wavelength band of a
wavelength band-pass filter respective thereof.

8. An optical multiplexer according to claims 4 or 6, wherein
said optical multiplexer is used for an optical signal
coupling apparatus which is provided with a plurality
of optical multiplexers, having a wavelength band-pass
filters of which wavelength bands for the light to
transmit are different from one another, further wherein
an optical fiber to guide the light supplied from a
wavelength band-pass filter of an optical multiplexer
is connected to another optical fiber to supply the
light to another wavelength band-pass filter of
another optical multiplexer so that a band passed
light is successively combined with another of the
light transmitted through said another wavelength
band-pass filter.

9. An optical apparatus comprising:

an optical filter which selectively transmits, attenuates or
reflects a light having a specific wavelength;

a first optical system which includes at least a first optical
fiber to guide the light supplied to the optical filter, and
a first lens to connect optically the first optical fiber
with the optical filter, and a second optical system which is oppositely provided to
the first optical system through the optical filter, said
second optical system including at least a second
optical fiber to guide the light supplied from the optical
filter, and a second lens to connect optically the optical
filter with the second optical fiber, wherein
a lens surface of an end surface of the first optical
system or the second optical system and a filter
surface of an end surface of the optical filter, each
including an optical path thereof, are bonded by
adhesive agent coated on a portion apart from the
optical path, further wherein
at least one of said lens surface and said filter
surface, being opposed each other, including a
coating having a low wet property in an area
around the optical path which blocks the adhesive
agent from penetrating into the optical path.

10. An optical apparatus comprising:

an optical filter which selectively transmits, attenuates or
reflects a light having a specific wavelength;

a first optical system which includes at least a first optical
fiber to guide the light supplied to the optical filter, and
a first lens to connect optically the first optical fiber
with the optical filter, and a second optical system which is oppositely provided to
the first optical system through the optical filter, said
second optical system including at least a second
optical fiber to guide the light supplied from the optical
filter, and a second lens to connect optically the optical
filter with the second optical fiber, wherein a metallic film is formed on an outer peripheral
surfaces of the first lens and the optical filter and the
first lens and the optical filter are coupled by a solder
provided on the metallic film.

* * * * *